Dec. 30, 1958  A. R. GOW ET AL  2,866,644
FOOTBALL HAVING A SECURELY GRIPPABLE LACELESS SURFACE
Filed July 26, 1952

INVENTORS
A.R. GOW
P. S. MADSEN
BY

ATTORNEYS

United States Patent Office 2,866,644
Patented Dec. 30, 1958

2,866,644
FOOTBALL HAVING A SECURELY GRIPPABLE LACELESS SURFACE

Arthur R. Gow, Hamden, and Paul S. Madsen, Bethany, Conn., assignors to The Seamless Rubber Company, New Haven, Conn., a corporation of Connecticut Application July 26, 1952, Serial No. 301,092

1 Claim. (Cl. 273—65)

This invention relates to athletic balls and more particularly to inflatable balls such as footballs of ellipsoidal or generally oval shape, although the invention in its broad aspects is not limited to such balls.

The invention also relates more particularly to ellipsoidal footballs which are of the so-called carcass type, the wall of the ball being a composite structure including an inflatable valve-equipped bladder and an outer cover of rubber or other plastic having the necessary elasticity.

The invention deals especially with the means employed for the purpose of enabling the ball to be gripped by the hand of the player.

In the game employing an elliposidal ball and involving with other features the execution of passes, the players have been assisted in gripping the ball by the laces commonly used, and also by formations such as longitudinal grooving commonly provided upon the surfaces of footballs. In rubber-covered footballs the laces and the longitudinal grooving of the leather-covered balls have commonly been replaced by imitative elements or features. With rubber-covered balls the players have also had the benefit of such surface roughness as could be provided upon the surface of rubber covers in the nature of pebbling or the like which is imitative of the surface of leather. These features, however, have not provided a satisfactory and effective non-slip surface upon the ball, whether covered with leather or with rubber. The laces are located only at the middle portion of the ball and at only one point in the circumference or ball girth, and it is apparent that for that reason there are many conditions encountered where hand grip against the laces is impossible or ineffective. As regards the longitudinal grooving commonly employed on the ball surface, this is usually characterized by rounded formations longitudinally disposed and only four in number, and these are not of much effect in enhancing the hand grip, especially under some conditions. The roughening of the ball surface in the nature of pebbling provides projections which are rounded and very shallow, and slipping of the hand upon such a surface is of the commonest occurrence.

One of the objects of the present invention is to provide a ball, especially a rubber-covered football of ellipsoidal shape, with means providing a more effective grip upon the ball as it is handled, thrown and caught.

Another object is to make the grasping of the ball more effective so as to reduce fumbling.

Another object is to provide a securely grippable ball of the type indicated, which is an improvement upon present balls by reason of the provision of an effective gripping surface which is of large area and of uniform character with respect to different areas of the ball surface.

Another purpose of the invention is to provide a ball of the character indicated in which the ball is given a very even balance, the weight in the case of an ellipsoidal ball being well balanced with respect to the major axis as well as the minor axis.

Figure 1:
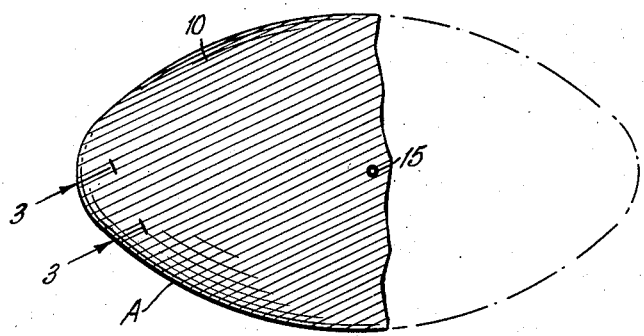
Fig. 1 is a somewhat diagrammatic elevational view of an ellipsoidal football embodying the invention, the showing of the surface roughening being partial only.

In Fig. 1 there is shown on a small scale an ellipsoidal football the outer surface of which is covered by generally longitudinally disposed ribs or elongated elements of toothlike profile. For the sake of clarity approximately half of the visible ribbing is omitted in this view. The detail showing of the ribbing is, however, disclosed in Figs. 2 and 3, which are on a greatly enlarged scale.

In Fig. 1 there is shown an ellipsoidal rubber-covered football at A, the same being provided in this case at the center of the major axis with an inflating valve 15. This valve has a stem located in an aperture in the ball cover, preferably so as to be substantially flush with the ball surface. The valve is preferably of the kind described in the De Laney and Madsen Patent No. 2,065,120, dated December 22, 1936, and it is carried by an inflatable bladder forming a part of a rubber-covered ball carcass of which the bladder is the innermost element.

The molded cover may be made of natural rubber or synthetic rubber, or a combination of the two, or of a plastic having properties similar to those of leather, but preferably it is quite resilient and at the same time highly resistant to abrasion.

The football should be of the form and dimensions which are official. In the "official" ball the curve of the ball side in the longitudinal direction for the greater part of the ball length has a radius which is relatively large, and at the tip or pointed end of the ball this curve merges into one drawn on a smaller radius. In the example shown, the ribbing extends completely to the ends of the ball, but the ribbing need not extend completely to the ends.

This rib formation provides a ball surface which greatly increases the grip of the player's hand on the ball in handling, passing and catching. The multiplicity of fine ribs enable the fingers and thumb of the player to make effective non-slip contact with the ball, and, as the ribbing preferably extends through the greater part of the ball length, there is greatly increased effectiveness of the grip upon the ball without regard to the region grasped or gripped or contacted by the hand. In a ball of ellipsoidal shape, where the ends are relatively pointed or acute, it is important to provide a good grip when the ball is gripped wholly in the end region, or mostly in the end region, for the reason that the wedgelike shape or formation of this region of the ball has made it especially difficult to hold it securely by the grasp of one hand. The act of grasping tends to expel the ball from the grasp. By the present structure, this tendency is counteracted or inhibited for the reason that the fine ribs of angular formation have a very effective interlocking and holding effect when contacted by the surfaces of the hand, even when the surfaces of the hand and ball are moist and greasy or otherwise in what might be called a lubricated condition. The rib surfaces press into the contacting surfaces of the hand to provide an effective interlock inhibiting longitudinal movement of the ball relatively to the hand. The rib arrangement, as shown, effectively inhibits escape of the ball from the grasp of the player.

It is obvious that in holding the ball in both hands, with the hands against opposite side portions of the ball, a large ribbed area of the ball will be contacted, and under such conditions the ball can be very securely gripped and locked so that it cannot be dislodged easily. It will also be apparent that in carrying the ball and in catching or receiving the ball on a kick or pass the holding effect is greatly increased in comparison to prior balls of the type hereinbefore mentioned. In passing or throwing, the ball may be grasped effectively nearer the end than would otherwise be the case, having the thumb at one side and the fingers at the opposite side, under which conditions the rib portions on the ball surface enhance the security of the grip. It is desired by many players to execute passes by holding the small-diametered portion of the ball, and this condition is met admirably when the ball structure is of the kind described. Under a large number of different conditions the enhanced gripping effect upon the ball made possible by the present construction is very advantageous.

Figure 2:
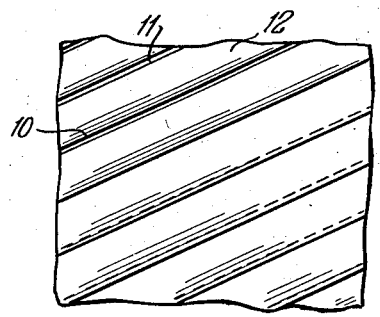
Fig. 2 is an enlargement of the surface formation shown in Fig. 1.
Figure 3:
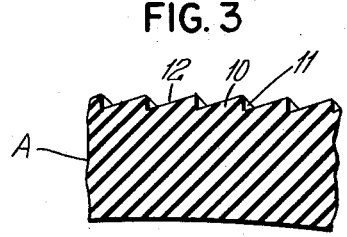
Fig. 3 is a section on line 3—3 of Fig. 1.

In the form shown in Figs. 1, 2 and 3, a rib 10 is employed, which is generally longitudinally disposed with respect to the ball, the rib being at a smaller angle to the major axis than to an imaginary plane perpendicular to the major axis. This rib has a normal face 11 presenting a shoulder, and a rather flat, gently sloping face 12. The normal or perpendicular face 11 should be disposed away from the adjacent end of the ball so as to increase the gripping effect, and more particularly the gripping effect when the ball is grasped in a region near to but not at the end of the ball. This is the region toward the center of the ball immediately adjacent the region where the change in the longitudinal side curvature of the ball occurs. Owing to the fact that the normal faces of the ribs should face away from the ends of the ball, for best results, the ribs should be provided in two series, one at one side of the ball center, facing toward one end of the ball, and the other at the opposite side of the center, facing in the opposite direction.

It will be seen from the foregoing that, as regards secure gripping and grasping of the ball in holding, throwing and catching, the surface roughness provided by the present invention offers very important advantages over balls of the types previously used, and especially rubber-covered balls relying on lacings, a limited amount of longitudinal grooving where the grooves are widely spaced from each other and lack sharpness, and surface roughening provided by pebbling or the like on a rubber surface. Moreover, the inhibition against relative displacement of hand and ball is more effective and more uniform in different portions of the ball. In football as now played it is desirable under many conditions to handle the end portion of the ball rather than the middle, especially in passing and in pitch-outs, and the herein described ball structure enables the player to have much better control of the ball under such conditions than was possible heretofore. It is to be observed that in all of the forms described the roughening of the ball surface is extensive in area, and in any case it is preferably located in zones—preferably continuous zones—on those parts of the ball where the lengthwise curvature is on a large radius but adjacent the end portion of small radius, whereby the end of the ball may be grasped effectively by one hand with inhibition of the expelling action referred to above.

The type of football herein described is obviously of advantage in kicking in comparison to a ball having lacing on the side, because it is not necessary to orient the ball, as is common practice in kicking footballs of the kind previously used. Moreover, in the usual footballs provided with longitudinal grooving, as hereinbefore mentioned, the thickness of the cover is much reduced where the grooves occur, and this produces a region of weakness where the ball is likely to fail, and this advantage is eliminated in a ball constructed as herein described.

It is to be noted that in the embodiment herein disclosed the rib-like elements are of a profile to present angles or corners for engagement by the hand of the player, there being a plurality of such elements per inch of ball surface, and preferably more than four such elements per inch. Sixteen of such elements per inch is well within the allowable upper limit of the fine closely spaced projections. It will be noted, for example, that the ribs present definite angles or corners in profile for engagement by the hand of the player.

While a particular form of the invention is disclosed herein, various other forms and modifications may be used, and various detail changes made without departing from the principles of the invention or the scope of the claim.

What we claim is:

An inflatable athletic ball having closely grouped non-slip ribs projecting therefrom in substantial parallelism, the ball being of ellipsoidal shape and the ribs being at an acute angle to the longitudinal direction of the ball, the ribs being divided into groups disposed at opposite sides of a plane perpendicular to and passing through the center of the major axis, the ribs of a given group each having a substantially normal side and a sloping side, the normal sides of each group of ribs facing away from the respective end of the ball.

References Cited in the file of this patent

UNITED STATES PATENTS

| | | |
|---|---|---|
| 1,543,724 | Roberts et al. | June 30, 1925 |
| 1,559,117 | Maynard | Oct. 27, 1925 |
| 1,931,429 | Buckner et al. | Oct. 17, 1933 |
| 2,011,760 | Gallinant | Aug. 20, 1935 |
| 2,194,674 | Riddell | Mar. 26, 1940 |
| 2,244,503 | Riddell | June 3, 1941 |
| 2,270,553 | Potito | Jan. 20, 1942 |
| 2,494,806 | Gibson | Jan. 17, 1950 |